Dec. 8, 1964     A. KANDELMAN     3,160,071

COMBINATION SERVO VALVE AND CONTROL MEANS

Filed Sept. 11, 1961

INVENTOR.
ALLEN KANDELMAN

BY R. E. Geauque

ATTORNEY

3,160,071
COMBINATION SERVO VALVE AND CONTROL MEANS

Allen Kandelman, Sepulveda, Calif., assignor to The Marquardt Corporation, Van Nuys, Calif., a corporation of California
Filed Sept. 11, 1961, Ser. No. 137,218
4 Claims. (Cl. 91—51)

This invention relates to a servo valve and more particularly to a spring type servo valve in which different flow areas through the coils of a pair of springs produce a pressure differential for moving a control rod.

Conventional spool type servo valves consist of machined cylinders with ports and closely fitted spool type pistons for governing the ports. This construction requires high tolerances and closely fitted machined surfaces to produce satisfactory operation. The present invention provides a servo valve in which high tolerance, machined surfaces are eliminated since the pressure differential on the control rod is produced by variable flow areas provided by spaces between the coils of springs.

It is therefore an object of the present invention to provide a servo valve in which the need for high tolerance, closely machined parts is eliminated.

Another object of the invention is to provide a spring type servo valve in which flow through the coils of a pair of springs encounters different flow areas in the different springs to produce different back pressures resulting in a pressure differential for actuating a control rod.

These and other objects of the invention not specifically set forth above will become readily apparent from the accompanying description and drawings, in which.

Figure 1:
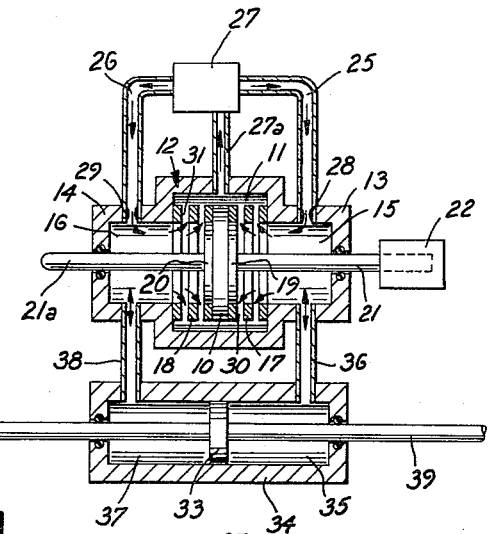
FIGURE 1 is a sectional view of the servo valve of the present invention showing the pair of coil springs.

Referring to the embodiment chosen for the illustration, a piston, or partition member 10 is located in an enlarged chamber 11 of a housing 12. The reduced ends 13 and 14 of the housing 12 define pressure chambers 15 and 16, respectively. A first flat wire metering spring 17 is located between the side of piston 10 and the reduced end 13, and a second flat wire metering spring 18 is positioned between the opposite side of piston 10 and the reduced end 14. Circular projections 19 and 20 receive the ends of springs 17 and 18, respectively, to support and center the springs and the opposite ends of the springs can be secured to the reduced ends of the housing in any suitable manner.

A rod 21 is secured to piston projection 19 and extends through reduced end 13 to connect with an actuator 22. The actuator can consist of a motor or diaphragm of well-know construction which moves the piston 10 in response to any selected control signal. A shaft 21a connects with the piston projection 20 and extends through the reduced end 14 so that the shafts 21 and 21a center the piston 10 within the casing 12 while permitting movement of the piston by actuator 22.

Supply passages 25 and 26 connect chambers 15 and 16, respectively, with the output of a hydraulic pump 27 and a return passage 27a connects the pump with the chamber 11. Passage 25 contains an orifice 28 at its end adjacent chamber 15 and passage 26 contains an orifice 29 at its end adjacent chamber 16.

With the piston 10 in its center, null position of FIGURE 1, space 30 between the coils of spring 17 is equal to the space 31 between the coils of spring 18. A control piston 33 is located in a casing or housing 34 and chamber or space 35 at one end of casing 34 is connected to pressure space 15 by passage 36, while chamber or space 37 at the other casing end is connected to pressure space 16 through passage 38. Control rod 39 is connected to piston 33 and extends through opposite ends of housing 34 to support and guide the piston. It is understood that the control rod is connected with selected mechanism to position same in accordance with the control signal imparted to actuator 22.

Figure 2:
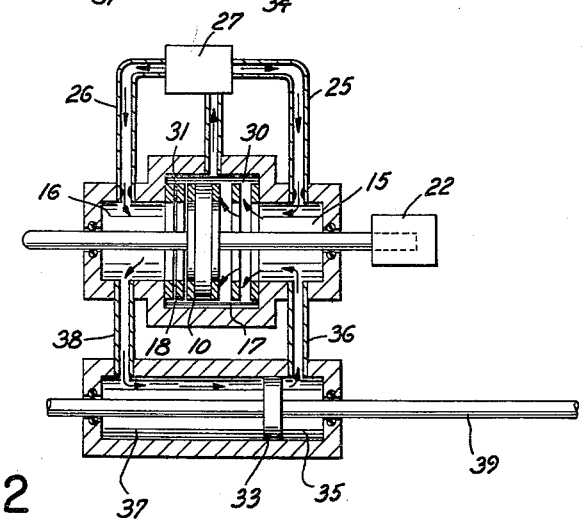
FIGURE 2 is a sectional view similar to FIGURE 1 in which the flow area through one coil spring is greater than through the other coil spring.
Figure 3:
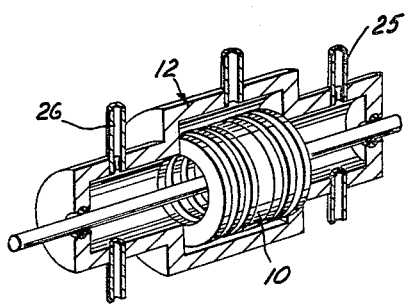
FIGURE 3 is a perspective view of the casing containing the coil springs.

Referring again to FIGURE 1, the actuator piston 33 is shown in its center position and the fluid pressures in the casing chambers 35 and 37 are equal. The pump 27 supplies equal pressures to chambers 15 and 16 through orifices 28 and 29 and when spaces 30 and 31 provide equal metering areas as in FIGURE 1, equal back pressures are maintained in spaces 15 and 16. Therefore, the pressures transmitted through passages 36 and 38 to chambers 35 and 37 are equal. When the actuator 22 moves the piston 10 to the left as illustrated in FIGURE 2, the spring 17 is extended to increases space 30 while the spring 18 is compressed to decrease space 31. Thus, the metering area provided by space 30 is increased while the metering area provided by space 31 is decreased, resulting in a higher pressure in chamber 16 than in chamber 15. The different pressures are communicated to actuator chambers 35 and 37 to cause movement of control rod 39 to the right and fluid in chamber 35 is exhausted through space 31 back to the pump 27. After the piston 10 is returned to its center, null position, the control rod 32 will remain in its new assumed position (such as the position shown in FIGURE 2), since equal pressures will again be present in chambers 35 and 37 when piston 10 is centered.

In order to return the control piston 33 towards the center of the casing 34, the actuator 22 moves the piston 10 to the right from its center, null position so that the spring 17 is compressed and the spring 18 is extended. Under such conditions, the pressure in chamber 35 becomes greater than the pressure in chamber 37 because the space 30 of spring 17 offers greater restriction to fluid flow than the space 31 of the spring 18. When the control rod 39 and control piston 33 have been moved back to the left the desired amount, actuator 22 can again move the piston 10 back to its null position in order to retain the control rod in its new position by applying equal pressures on opposite sides of piston 10.

It is understood that the pump 27 produces a constant output pressure in the passages 25 and 26 and that there is continuous flow from these passages through spaces 30 and 31 and back to the pump through return passage 27a. Thus, the orifices 28 and 29 provide a pressure drop from the pump supply pressure into the chambers 15 and 16. If it were not for the orifices 28 and 29, the chambers 15 and 16 would have the pump supply pressure at all times and it would not be possible to obtain a variation in pressure between the chambers 15 and 16. Thus, the orifices 28 and 29 and the spaces 30 and 31 provide two metering restrictions in each flow line from the pump 27 back to the return line 27a and the pressure intermediate orifice 28 and spring space 30 is controlled by the size of space 30 while the pressure intermediate orifice 29 and the spring space 31 is controlled by the size of the space 31.

The valve of the present invention has the advantage that it has an inherent self-nulling characteristic, since the pressure differential acting on the piston 10 is always in a direction to return the piston 10 back to its null position in the event the force of actuator 22 is removed. It is apparent that the servo valve of the present invention is much cheaper to manufacture than a spool type servo valve and that the present invention has the advantages of less break away and running friction. The variable orifice spaces 30 and 31 can be produced by openings in overlapping sleeves or by other suitable devices instead of by springs, and the piston 10 can be replaced by any suitable partition member. Various modifications are contemplated by those skilled in the art without departing from the spirit and scope of the invention as hereinafter defined by the appended claims.

What is claimed is:

1. A servo valve comprising a partition member located within a casing, separate means extending in opposite directions from said member to engage separate portions of said casing, each separate means having a flow area therethrough variable with the position of said member to provide a variable restriction to fluid flow, means for providing a constant fluid pressure, means for connecting each flow area to said pressure through orifice means, and means for applying the pressures upstream of said separate means to control means in order to position the control means.

2. A servo valve comprising a movable partition member located within a casing, first and second spring means extending in opposite directions from said member into engagement with separate casing portions in order to divide the casing into first and second chambers on opposite sides of said member and chamber means surrounding said springs, means for supplying a constant fluid pressure to separate orifices at the entrance to said first and second chambers, means for exhausting the fluid in said chamber means resulting from flow through the space between the coils of each of said spring means, and means for applying the pressures existing in said first and second chambers to position a control means, said spaces and pressures being variable with the position of said partition member in said casing.

3. A servo valve comprising a piston located within a casing, first spring means extending between said piston and a portion of said casing to divide the casing into first and second chambers with the first chamber interiorly of said first spring means, second spring means extending from said piston in the opposite direction and into engagement with another portion of the casing to divide said casing into a third chamber interiorly of said second spring means and separate from said first and second chambers, said first and second springs having equal flow areas therethrough when the piston is in its null position, pump means connected with separate fluid supply lines for supplying fluid to said first and third chambers, said separate flow lines each containing an orifice, a separate return line for connecting said second chamber with said pump, a control element contained within a housing, a first space at one end of said housing connected to said first chamber, a second space at the other end of said housing connected to said third chamber, and means for moving said piston to vary the flow areas through said first and second springs to produce a differential pressure on said control element.

4. A servo valve comprising:
a movable partition member located within a casing;
separate means extending in opposite directions from said member to engage separate portions of said casing, each separate means having a flow area therethrough variable with the position of said member to provide a variable restriction to fluid flow;
means for providing a constant fluid pressure;
means for separately connecting each flow area to said pressure through separate orifice means;
means of selectively positioning said partition member to vary said flow areas and thereby vary the separate pressures existing upstream thereof; and
means for applying said upstream pressures to control means in order to position the control means.

References Cited in the file of this patent

UNITED STATES PATENTS

| | | |
|---|---|---|
| 1,292,013 | Munger | Jan. 21, 1919 |
| 2,380,705 | Proctor | July 31, 1945 |
| 2,638,925 | Monahan | May 19, 1953 |
| 2,860,605 | Banker | Nov. 18, 1958 |
| 2,904,055 | Witherell | Sept. 15, 1959 |
| 2,931,388 | Renick et al. | Apr. 5, 1960 |
| 2,983,278 | Heintz | May 9, 1961 |
| 3,023,781 | Larsen | Mar. 6, 1962 |
| 3,023,782 | Chaves et al. | Mar. 6, 1962 |

FOREIGN PATENTS

| | | |
|---|---|---|
| 1,116,952 | Germany | Nov. 9, 1961 |